United States Patent [19]

Landers

[11] Patent Number: 4,751,947
[45] Date of Patent: Jun. 21, 1988

[54] SYSTEM FOR PLUGGING CONDUITS

[76] Inventor: Phillip G. Landers, 518 Santander Dr., San Ramon, Calif. 94583

[21] Appl. No.: 67,874

[22] Filed: Jun. 30, 1987

[51] Int. Cl.$^4$ .............................................. F16L 55/10
[52] U.S. Cl. ............................................ 141/1; 138/89
[58] Field of Search .......................... 138/89; 141/1, 9; 206/219

[56] References Cited

U.S. PATENT DOCUMENTS 4,092,296  5/1978  Skiff ................................ 260/47 EP Primary Examiner—Mark J. Thronson
Attorney, Agent, or Firm—Thomas R. Lampe; Glen R. Grunewald

[57] ABSTRACT

A system for plugging a conduit wherein a container containing a foaming agent and having a pull tab and opening is placed within the conduit interior with the pull tab positioned between a barrier element and the conduit so that pulling of the tab extrudes the container's contents within the conduit.

8 Claims, 2 Drawing Sheets

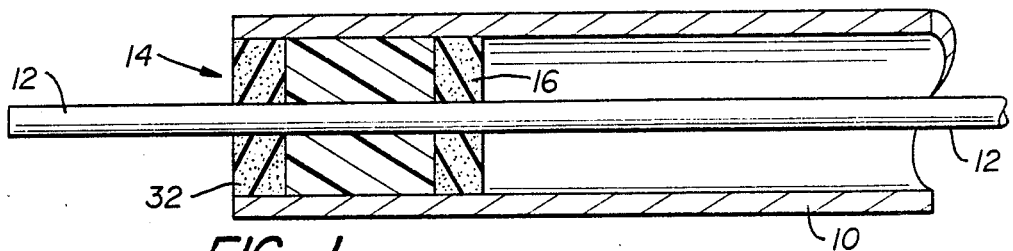
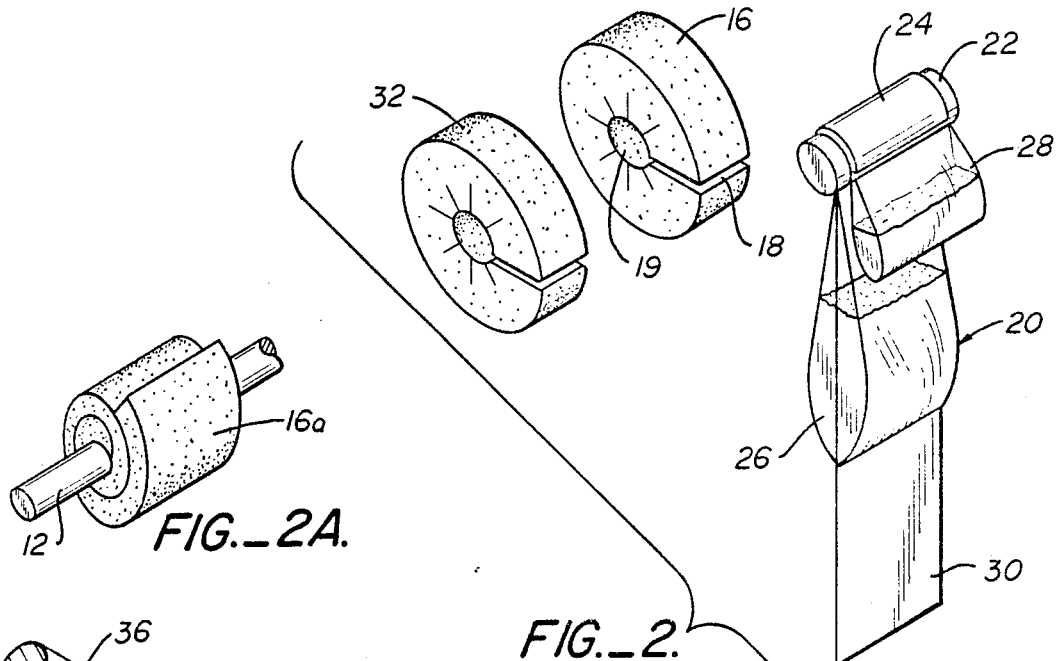
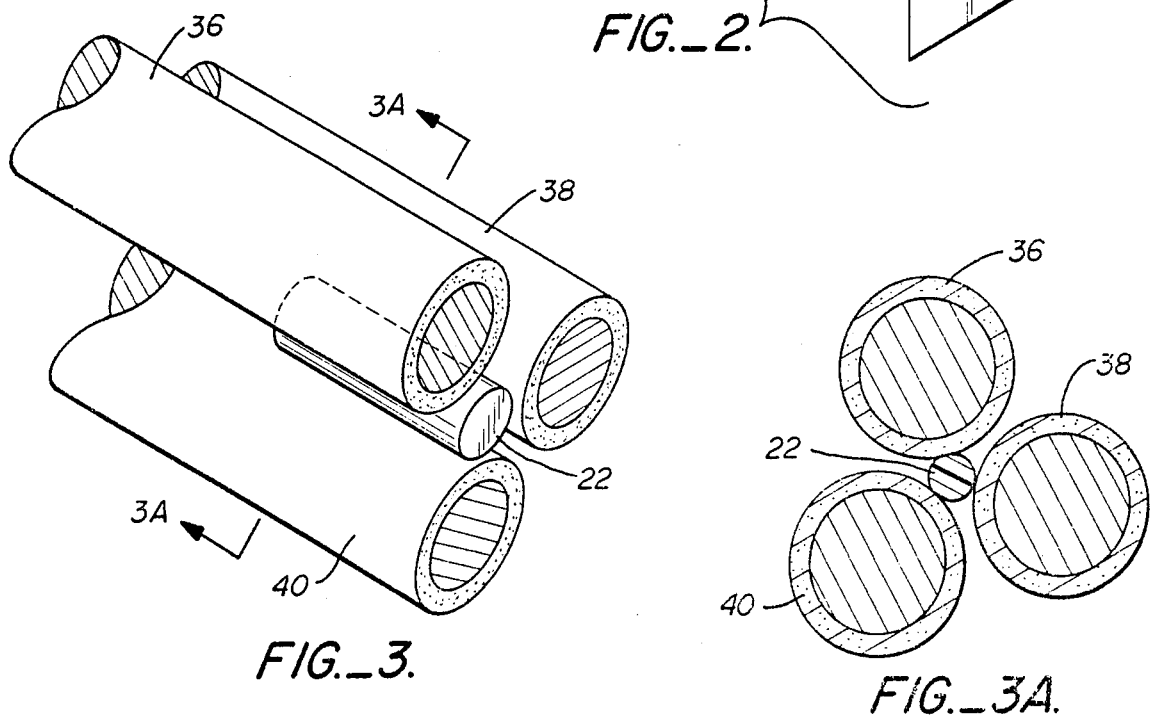

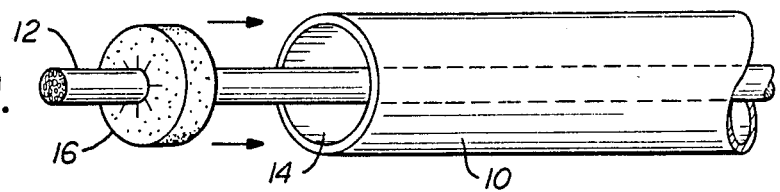
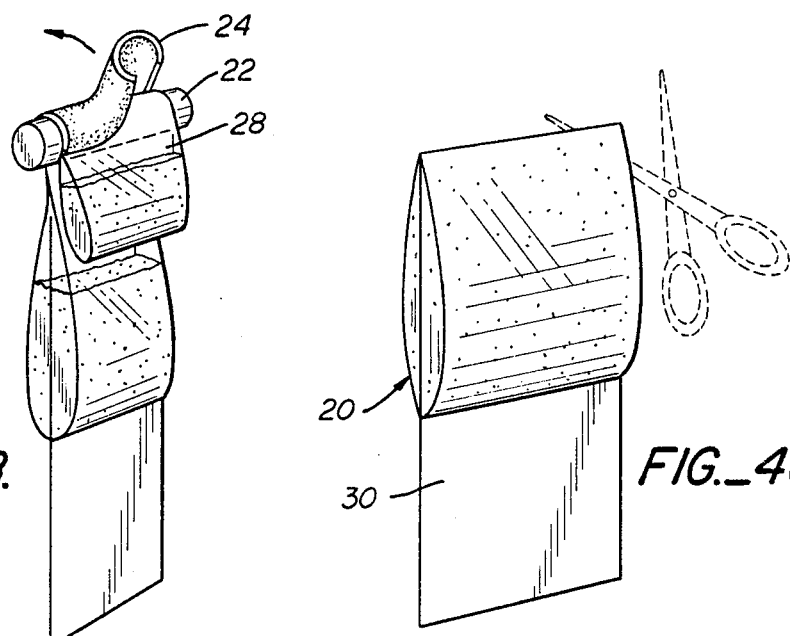
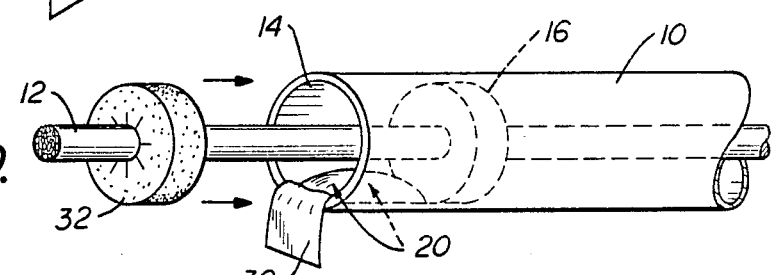
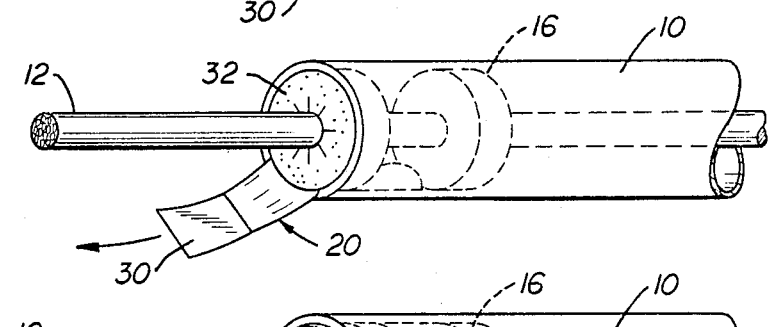
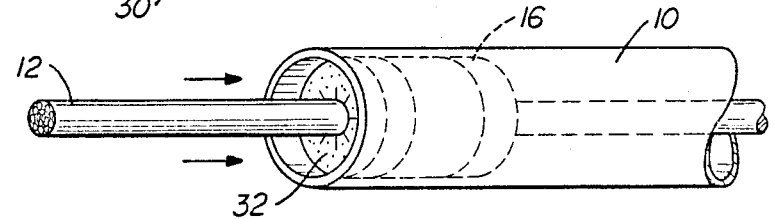
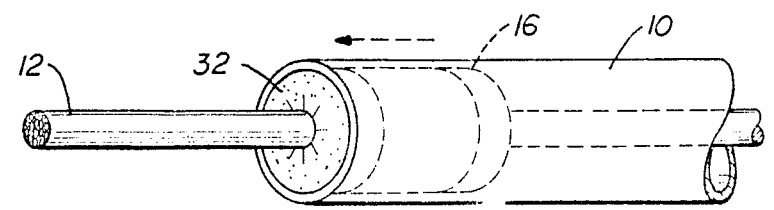

SYSTEM FOR PLUGGING CONDUITS

TECHNICAL FIELD

This invention relates to a system for in situ forming of a plug in a conduit, duct or other member having a cavity. The system has particular application to conduits disposed underground, such as those housing electrical cables.

Methane gas and other undesirable substances occasionally leak into underground conduits. This phenomenon can cause safety problems, especially if the substances work their way into residences or other structures served by the conduits. For example, fires and explosions have occurred when flammable gases have built up in a conduit over a period of time.

BACKGROUND ART

Previous techniques have been devised for plugging electric and other conduits to prevent gases and other types of harmful substances from contaminating the conduits and posing a threat to serviced structures. One such technique involves the use of expandable foaming agents which are injected into a conduit, foamed to fill a plug, and hardened in situ. Foaming systems conventionally have more than one component which are mixed just prior to placement in conduit.

It is known practice to mix the components in a flexible container and then squeeze the container to extrude its contents through a container outlet into a conduit in which a sponge or other barrier element has already been positioned. After this has been done, another barrier element is inserted in a conduit to provide a confined space within which the foaming and foam hardening action can take place.

This procedure can be messy as well as ineffectual. It is often difficult to work within the confined space of a conduit and waste can occur. Perhaps more importantly, improper or inadequate placement of a foaming agent may take place and a fluid-tight plug may not be formed.

DISCLOSURE OF INVENTION

The present invention relates to an improved system for creating a foamed plug within the interior of a conduit or duct. In common with certain prior art techniques, the system utilizes a flexible container to place the foaming agent within the conduit. However, the present invention relates to an improved device and method by which the user may quickly and efficiently form a foamed plug in situ without waste and with a high degree of assurance that a fluid-tight plug is formed. In addition, almost no wastage of foaming agent occurs when the device of the present invention is employed and the steps of the method of the invention are carried out.

According to the teachings of the present invention, a first barrier element is inserted within the interior of a conduit. A container containing a foaming agent is then also inserted into the conduit, adjacent to the first barrier element. A pull tab projects from the container and is oriented by the operator away from the first barrier element and toward an open conduit end.

A second barrier element is then inserted within the conduit interior at a location spaced from that occupied by the first barrier element. The pull tab projecting from the container is disposed between the second barrier element and the conduit. When the operator pulls the tab, the container is withdrawn from the conduit and passes between the second barrier element and the conduit.

The second barrier element and conduit cooperate to extrude the foaming agent in the container through an opening formed therein. Virtually all of the foaming agent is thus deposited into the conduit between the barrier elements. Foaming in situ then occurs. Because the foam is restricted by the barrier elements, a complete filling of the void space therebetween is assured.

BRIEF DESCRIPTION OF DRAWINGS

FIG. 1 is a cross-sectional view showing a portion of a conduit with a plug therein, said plug having been formed by the system of the present invention;

FIG. 2 is a perspective view illustrating certain components of the apparatus of this invention;

FIG. 2A is a perspective view showing an alternative form of barrier element;

FIGS. 3 and 3A are views showing a plurality of electrical cables separated by a component of the present invention; and FIGS. 4A–4G illustrate in somewhat schematic fashion the various step carried out when practicing the method of this system.

BEST MODE FOR CARRYING OUT THE INVENTION

Referring now to the drawings, an underground conduit 10 is illustrated. By way of example, conduit 10 is an electrical conduit and has an electric cable 12 disposed therein. Conduit 10 has an open end 14.

Prior to practicing the present invention in the manner which will be described below, it is preferred that the conduit and electric cable be cleaned utilizing a solvent approved for use on electric cables to remove any grease, oil or other substance that might interfere with foam bonding and sealing. This can be done with a bottle brush (not shown) or any other similar tool.

After the cleaning has been accomplished, the electric cable 12 is centered within the conduit 10 and a first barrier element 16 is disposed about the cable (as shown in FIG. 4A) and positioned in the conduit. A preferred form of first barrier element 16 is shown in the drawings and may comprise a doughnut-shaped sponge formed of polyethylene, polyurethane, or other suitable material. Preferably, the material is of open cell type for reasons which will be given below. The element 16 has an outer circumference somewhat exceeding that of the conduit so that the element is essentially press fit into position. A slit 18 formed in the element 16 allows the element to be slipped over cable 12 and the cable to be disposed within the central aperture 19 of the element. Either manually or through use of a suitable tool, first barrier element 16 is located within the conduit at a predetermined position, which may, for example, be with the outer face of the first barrier element 1 positioned about three to four inches from the open conduit end.

An alternative form of first barrier element may simply be an elongated strip 16a, also of sponge-like, flexible material, which may be rolled about the cable and about itself as shown in FIG. 2A. Again, it is preferred that the material employed in construction of the first barrier element be of open cell type.

The next component to be placed within the conduit 10 is a container 20. The container 20 is received by the user in the form shown in FIGS. 2 and 4B. Container 20 is wrapped partially about and in engagement with an elongated pin 22. The pin 22 is in contact with the outer surface of the container at a location between the ends thereof and the pin extends at least the full width of the container. A clamp 24 constructed of plastic or any other suitable material connects container 20 to pin 22 and divides the container into chambers 26 and 28. Each of these chambers contains a suitable foaming agent or system component. For example, a liquid epoxy foam system having a ceramic filler, such as the foam marketed by Insitu Corporation under the trademark "InsituFOAM" and incorporating materials disclosed in U.S. Pat. No. 4,092,296, is particularly well suited for forming foam plugs in situ. The epoxy resin and blowing agent can be contained in chamber 26 and the curing agent contained in chamber 28. The method and apparatus can be used to deliver other foam systems, such as, polyurethane and polyethylene foams, but epoxy foams are particularly advantageous when used in connection with electrical conduits, since electrical fires will not produce toxic combustion products.

As is conventional, when these components are mixed a foam is created. To mix the components, the user removes clamp 24 from container 20 and elongated pin 22, thus establishing communication between the chambers 26 and 28. The operator then thoroughly kneads the bag to mix the components, thus initiating the chemical process which causes the foaming action.

Preferably, container 20 is constructed of a plastic film material such as a mylar/polyethylene laminate. A pull tab 30 is located at one end of container 20 as shown. The pull tab 30 is preferably created by sealing the mylar/polyethylene laminate container at a location (such as 3-4 inches) spaced from its end and along the width thereof. Alternatively, the pull tab can be a separate element constructed of any suitable material which may be either different from or the same as the material utilized to construct container 20 and attached to the container by any desired expedient such as by being heat sealed or adhesively secured thereto.

The next step in the operation is as follows. The operator cuts container 20 at the end thereof opposed to pull tab 30 to provide a container opening or outlet. This may be done by puncturing the container or by cutting off the end or a corner thereof by means of scissors or any other suitable instrument as shown in FIG. 4C. The container 20 is then placed, as shown in FIG. 4D, into the interior of the conduit adjacent to first barrier element 16 with the pull tab 30 directed away from the element 16 and toward conduit open end 14.

Next, a second barrier element 32, which may be similar in construction to first barrier element 16, is disposed about electric cable 12 and inserted within conduit 10. It is important that pull tab 30 be disposed between second barrier element 32 and the conduit wall.

The operator now grasps pull tab 30 in one hand while placing his other hand on second barrier element 32. He pulls tab 30 toward him which, of course, results in container 20 passing between second barrier element 32 and conduit 10. This action (illustrated in FIG. 4E) causes the foaming agent within container 20 to be extruded therefrom through the aperture or opening formed at the inner most end of the container.

After the empty container 20 is completely removed from the interior of conduit 10, the operator may push second barrier element 32 further into conduit 10 until the foaming agent is squeezed about cable 12 and in contact with the entire face of first barrier element 20 (FIG. 4F). The foaming agent will then expand and force the barrier elements 16 and 32 apart (as shown in FIG. 4G). After the foam hardens, an effective liquid and gas barrier is formed within the conduit.

During foam formation, gases will be created and it is desireable to dissipate these gases within the conduit interior. Because the first barrier element is constructed of open cell material, this may be readily accomplished.

Sometimes, more than one electric cable may be disposed within a conduit. This particular situation is disclosed in FIGS. 3 and 3A wherein, for purposes of simplicity, the conduit surrounding the cables is not shown. To insure that a proper fluid-tight plug is formed in this circumstance, it is necessary to separate the cables from one another. That way, the foam will be certain to flow into the intersticies formed by the cables. The three electric cables (designated by reference numerals 36, 38 and 40) are separated and such separation is maintained by wedging pin 22 (utilized initially to divide container 20 into chambers 26 and 28) therebetween.

As also will be understood, the method and apparatus of the present invention may be employed to form a foam plug in situ in a conduit not having conductor 12. Thus, the ends of a conduit are sometimes plugged prior to pulling the wire and then drilled open and thereafter re-plugged.

What is claimed is:

1. A method of plugging the interior of a conduit with barrier elements, at least one of said barrier elements being formed of open cell, flexible material, said method comprising the steps of:

through an open conduit end, inserting a first barrier element at a predetermined position within the conduit interior;

during insertion of said first barrier element, compressing said first barrier element against the conduit whereby said first barrier element is press fit in said conduit interior at said predetermined position;

placing a container containing a foaming agent and having a pull tab projecting therefrom into the interior of said conduit adjacent to said first barrier element with the pull tab directed away from said first barrier element and toward said open conduit end;

inserting a second barrier element within the conduit interior at a location spaced from said predetermined position whereby the container is between said barrier elements with the pull tab disposed between said second barrier element and said conduit;

during insertion of said second element, compressing said second barrier element against the conduit and pull tab whereby said second barrier element is press fit in said conduit interior;

pulling said tab whereby said container is withdrawn from said conduit between the second barrier element and said conduit, the second barrier element and the conduit cooperating to extrude the foaming agent from a container opening into said conduit between said barrier elements;

foaming said foaming agent whereby said agent expands to engage said barrier elements and fills the conduit interior between the barrier elements;

during said foaming step, venting gases produced by said foaming through the open cell flexible material; and hardening said foam while in engagement with said barrier elements and said conduit to form a liquid and gas barrier.

2. The method of claim 1 wherein the foaming agent comprises a plurality of components, said method further including the steps of mixing said components and forming said container opening prior to placing said container into the interior of said conduit.

3. The method of claim 2 wherein said container opening is formed by severing said container at a location spaced from said pull tab.

4. The method of claim 3 wherein said container has two ends and said pull tab is connected to one of said ends, said container opening being located at the other of said ends.

5. The method of claim 1 wherein a plurality of electric cables are disposed within said conduit; said method comprising the additional steps of separating said cables and maintaining the separation between said cables prior to the step of pulling the tab to withdraw the container from said conduit.

6. The method of claim 1, during the foaming step, utilizing said expanding foaming agent to push apart said barrier elements.

7. A method of delivering a foam system into a cavity in a member having a cavity opening for in situ foaming of said cavity comprising the steps of:

placing a deformable container having said foam system with mixed components inside said cavity, said container further having a pull tab extending away from one end thereof and having a container opening remote of said pull tab;

inserting barrier means constructed of open cell, flexible material into said cavity through said opening;

during said inserting step, disposing said pull tab to extend from said cavity between said barrier means and a wall defining said cavity opening to a position outwardly of said barrier means;

during said inserting step, compressing said barrier means against said member and pull tab whereby said barrier means is press fit in said cavity opening;

after said inserting step, pulling said pull tab away from said barrier means while maintaining said barrier means positioned in said cavity opening to withdraw said deformable container past said barrier means and to extrude said foam system out of said container opening and into said cavity for in situ foaming of said cavity; and during said in situ foaming, venting gases produced by said foaming through the open cell, flexible material.

8. The method of claim 7 wherein, said member having said cavity is a conduit and said cavity opening is an open conduit end, and the step of:

prior to said placing step, positioning a first barrier in said conduit through said open conduit end at a position in said conduit defining one end of said cavity to be foamed;

during said placing step, placing said flexible container in said cavity through said open conduit end;

during said step if inserting, inserting a second barrier of open cell, flexible material in said conduit through said open conduit end to a position spaced apart from said first barrier;

during said disposing step, disposing said pull tab to extend outwardly beyond said second barrier and during said pulling step, pulling said pull tab outwardly from said second barrier whereby said flexible container passes between said conduit and said second barrier to extrude said foam system between said barriers.

* * * * *

UNITED STATES PATENT AND TRADEMARK OFFICE
CERTIFICATE OF CORRECTION

PATENT NO. :   4,751,947
DATED      :   June 21, 1988
INVENTOR(S):   Phillip G. Landers It is certified that error appears in the above-identified patent and that said Letters Patent is hereby corrected as shown below:

Column 2, line 24, "step" should be --steps--.

Column 2, line 58, "1" should be --16--.

Column 4, line 56, --barrier-- should appear before "element".

Column 6, line 28, "if" should be --of--.

Signed and Sealed this

Twenty-eighth Day of February, 1989

Attest:

DONALD J. QUIGG

*Attesting Officer*   *Commissioner of Patents and Trademarks*